Patented May 18, 1943

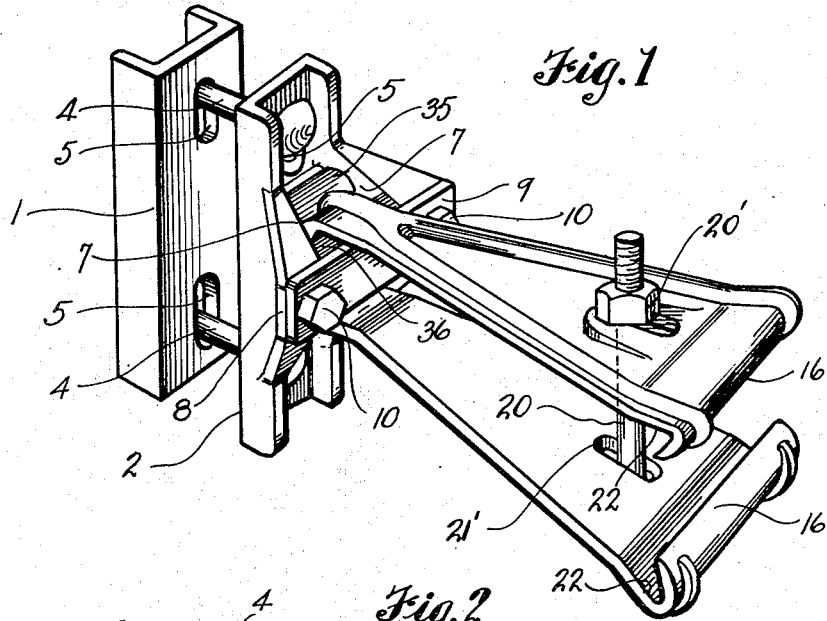
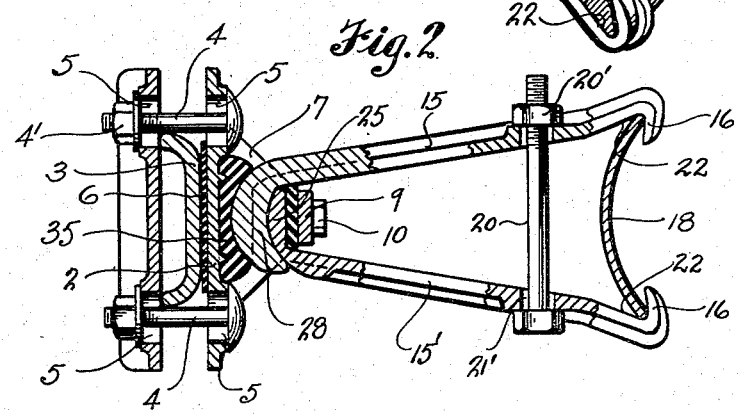
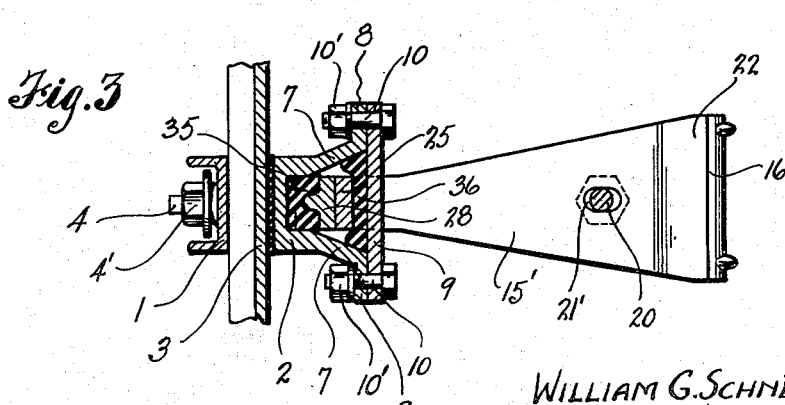

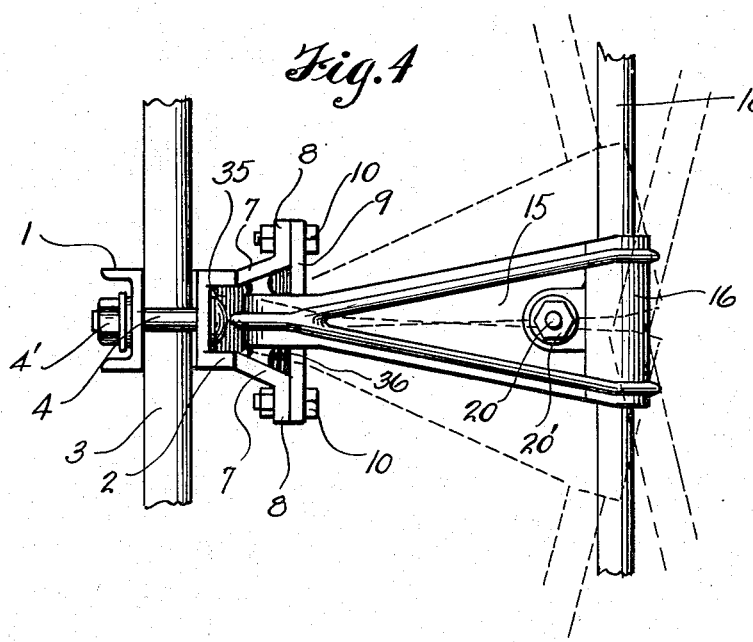
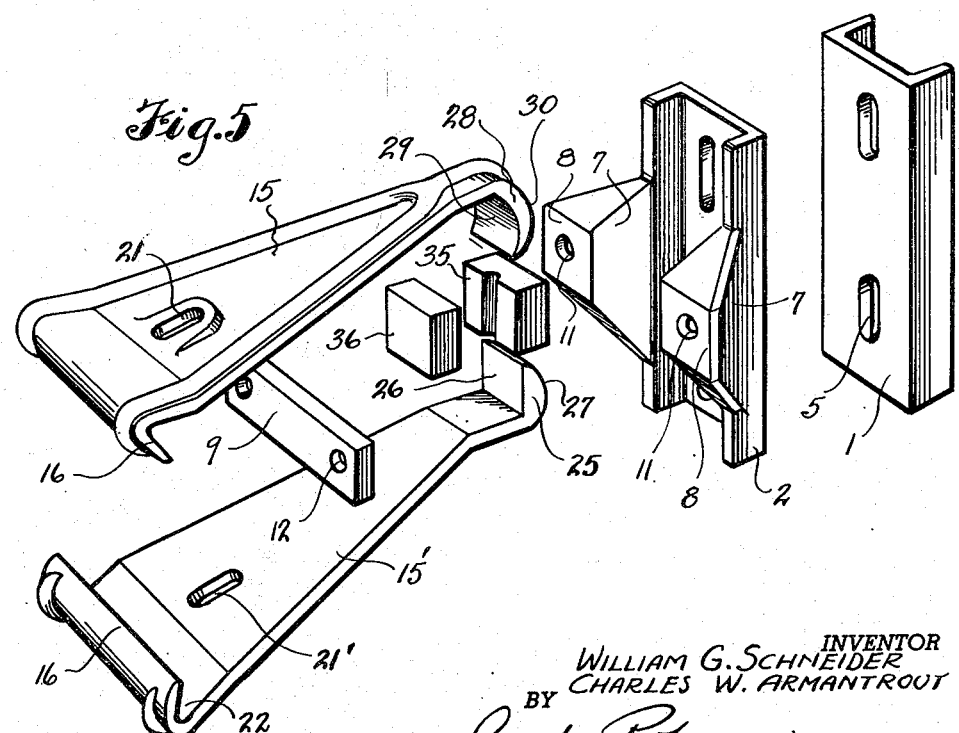

2,319,521

UNITED STATES PATENT OFFICE 2,319,521

AUTOMOBILE TOW BAR

William G. Schneider and Charles W. Armantrout, Seattle, Wash.

Application August 1, 1941, Serial No. 405,054

3 Claims. (Cl. 280—33.14)

This invention relates to improvements in automobile tow bars, and has reference more particularly to tow bars of the type whereby a towing connection may be made between the rear bumper bar of the towing vehicle and the front bumper bar of the towed vehicle; it being the principal object of this invention to provide improved details of construction for closer coupling of the towed and towing vehicle; which is more substantial and safer in its intended uses; which is more easily and more quickly applied or removed; and which, through a novel application and use of resilient bushings and without use of pivot bolts, or universal joints, provides the required flexibility for travel of the connected vehicles over uneven roadways without undesirable strain and without damage thereto.

More specifically stated, the objects of the present invention reside in the provision of a short coupled tow bar for the above stated purposes, comprising a pair of clamp bars adapted to be opposedly applied to front and back sides of the bumper bar of one of the vehicles for fixed securement thereto, and a pair of clamp jaws adapted to be opposedly applied at their outer ends to the top and bottom edges respectively of the bumper bar of the other vehicle and holdingly secured thereto by the tightening of a bolt that extends between the jaws; the two jaws being secured at their inner ends to the clamp device, applied to the other vehicle, through the mediacy of a cross bar and rubber bushings, which latter provide the necessary flexibility in the connection for turning.

Other objects of the invention are to be found in those details of construction of the clamp bars that adapt them to be adjusted to accommodate different sizes and types of bumper bars; and in the use of the rubber bushings therewith for flexibility of connection necessary to satisfactory use.

In accomplishing these and other objects of the invention, we have provided the improved details of construction, the preferred forms of which are illustrated in the accompanying drawings, wherein—

Fig. 1 is a perspective view of a tow bar embodied by the present invention.

Fig. 2 is a sectional detail of the same, in a vertical plane, longitudinally of the device.

Fig. 3 is a sectional detail taken on the line 3—3 in Fig. 2.

Fig. 4 is a plan view, illustrating the application of the device to the bumper bars of a towing and towed vehicle.

Fig. 5 is a perspective view of parts of the device in disassembled relationship.

Referring more in detail to the drawings—

In the present preferred form of construction, the tow bar embodied by this invention comprises, at one end, an attaching clamp made up of a short length of channel bar 1, and a complemental bar 2, also of channel form; these bars 1 and 2 being adapted to be disposed in vertically directed positions at the inside and outside respectively of the bumper bar of one of the vehicles which are to be connected. In Fig. 2, the bumper bar of one of the vehicles is designated by reference character 3. When so applied to the bumper bar, the clamp is secured through the mediacy of clamp bolts 4 that are extended through openings provided therefor in the bars 1 and 2.

For purpose of better understanding and easier explanation, the bumper bar 3 will be considered that of the towing vehicle, and the clamp bars 1 and 2 will be at the forward end of the tow bar.

As will be understood best by reference to Fig. 2, the openings 5 are somewhat elongated to permit adjustment in spacing of the bolts to accommodate bumper bars of different widths and permit the disposition of the bolts closely against top and bottom edges of the bumper bar, as observed in Fig. 2, to give added rigidity of connection. Also, it is noted that, through the tightening of the nuts 4' on the bolts 4, the clamp bars 1 and 2 may be drawn tightly against front and rear sides of the bumper bar. Preferably, a sheet of rubber 6, or other suitable material, is placed between the face of the bumper bar 3 and inner face of clamp bar 2, to protect the surface of the bumper.

The clamp bar 2 is formed at opposite sides with outwardly inclined, laterally diverging flanges 7 and 7' terminating in lateral wings 8 and 8' to which the opposite end portions of a transverse holding bar 9 are secured by bolts 10 for a purpose presently explained; the bolts 10 being extended through openings 11 and 12 provided therefor in the wings and ends of the cross bar, respectively, and equipped with tightening nuts 10'.

Secured to the clamp bar 2, by the holding bar 9, as will presently be described, is a pair of clamp jaws 15 and 15'. These jaws are co-extensive and disposed, one above the other, and are formed at their rearward ends with inturned hooks 16 adapted to engage with top and bottom edges of the bumper bar of the towed vehicle;

such a bumper being designated at 18 in Fig. 2. The securement of the opposed clamp jaws to the bumper bar 18 is effected through the mediacy of a bolt 20 that extends through openings 21—21' in the jaws near their outer ends. Tightening of the nut 20' on the bolt draws the jaws to holding position, and to facilitate the holding connection, the jaws are laterally flared, as noted in Figs. 1 and 3, to a width of several inches, and seats within the hooks 16 are provided, as at 22, to receive the edges of the bumper bar. The clamp jaws 15 and 15' may be adjusted apart as may be required or desired to accommodate bumper bars of different widths.

The details of construction of the connected ends of the clamp jaws 15 and 15' and the means for and manner of connecting them with the clamp bars applied to the towing vehicle is important in this invention. First, the usual form of pivot or universal joint connection has been eliminated and provision for flexibility of connection that may be required for turning has been taken care of by use of flexible bushings in the connection, and the provision of means to compensate for relative vertical movement of the towed and towing vehicles, except as is inherent in the rubber bushings, has been discarded as unnecessary in view of the spring suspension of the vehicle bodies.

Referring now more particularly to Figs. 2, 3 and 5, it is noted that the lower clamp jaw 15' is formed at its forward end with an upwardly directed toe 25 having a substantially flat rearward surface 26 and a cylindrically rounded forward surface 27. Likewise, the upper clamp jaw 15 is formed at its forward end with a downwardly directed toe 28 having a cylindrically rounded surface 29 conforming to and slidably fitted on the surface 27 of the toe 25 of the lower jaw and with a cylindrically rounded forward surface 30.

The curvature of the surfaces 27 and 29 are the same and provide that they retain close sliding engagement for the various adjustments of the jaws in their application to bumpers of different vertical widths.

Interposed between the forward rounded surface 30 of the toe of the upper clamp jaw 15 and the rearward face of the clamp bar 2, and confined between the opposite side flanges of the bar is a block of rubber 35, and likewise between the rearward face 26 of the toe of the lower clamp jaw and the cross bar 9 is a block of rubber 36. These blocks of rubber are assembled with the parts prior to application of the cross bar 9 and prior to assembly, are of substantial thickness as is indicated in Fig. 5. However, upon tightening of the nuts 10' on bolts 10 which draw the holding bar 9 to place, the rubber blocks will be considerably displaced and caused to flow about the edges of the connected parts as shown best in Fig. 3. While these rubber bushings 35 and 36 hold the parts firmly assembled, they provide, at the same time, for all the flexibility of connection required. The yieldability of the bushings permits lateral swinging of the rearward ends of the clamp jaws, as to the dotted line positions in Fig. 4 and there is slight up and down movement possible.

With the tow bar so constructed and applied, a short coupled connection is provided through which a positive control of the towed vehicle is accomplished. In turning, the bushings yield as required for lateral pivotal movement of the clamp jaws, and in passing over an upward or downward curve in the roadway a hinge action to a limited extent is possible, and beyond that the resiliency of the springs of the vehicles compensates for the relative upward or downward tilt of the vehicles.

Such bars may be made in various sizes, and details might be modified without departing from the spirit of the invention.

Having thus described our invention, what we claim as new therein and desire to secure by Letters Patent is:

1. An automobile tow bar comprising, at one end, an attaching clamp adapted to be rigidly affixed to the bumper bar of a towing automobile, a pair of coextensive clamp jaws extending rearwardly from the said attaching clamp, and having forward end portions turned inwardly into overlapped relationship and pivotally interfitted for opening and closing of the rearward end portions of the jaws for application respectively to top and bottom edges of the bumper bar of a vehicle to be towed, means for clamping the jaws together in holding connection with the bumper bar of the towed vehicle and means fixing the forward ends of said jaws to the attaching clamp, and including a clamp bar and resilient bushings held thereby and disposed at back and forward faces of said pivotally overlapped portions.

2. An automobile tow bar having, at one end, an attaching clamp comprising vertical bars that are applicable respectively to front and rear sides of the bumper bar of a towing automobile, and bolts extended through corresponding ends of said bars to functionally secure them in place on said bumper; a pair of elongated clamp jaws extended rearwardly from said attaching clamp; said jaws having forward end portions pivotally interfitted for opening and closing action of the rearward ends of the jaws for application respectively to top and bottom edges of the bumper bar of a vehicle to be towed, a clamp bolt extended between the jaws and engaged therewith for securing them in holding connection with the bumper bar of the towed automobile, rubber bushings housing the pivotally associated ends of the said jaws, and a holding bar applied over said bushings to functionally fix the jaws to the attaching clamp and to permit limited lateral oscillation of the jaws.

3. A tow bar as in claim 2 wherein the forward ends of the jaws are pivotally interfitted through the mediacy of inturned and overlapping toes, and wherein the bar of the attaching clamp that is disposed against the outside of the bumper bar has laterally spaced flanges between which said pivoted ends are disposed, and wherein said rubber bushings are applied between said flanges at front and rear sides of said interfitted end portions and are displaced and clamped in place by said holding bar; said holding bar being secured to said flanges.

WILLIAM G. SCHNEIDER.
CHARLES W. ARMANTROUT.